(12) United States Patent
Kumakura

(10) Patent No.: US 7,241,359 B2
(45) Date of Patent: Jul. 10, 2007

(54) METHOD OF MANUFACTURING HARD DISC DEVICE WITH A PRINTED WIRING BOARD FIXED THERETO

(75) Inventor: Masayuki Kumakura, Kanuma (JP)

(73) Assignees: Sony Corporation, Tokyo (JP); Sony Chemical & Information Device Corporation, Tokyo (JP)

( * ) Notice: Subject to any disclaimer, the term of this patent is extended or adjusted under 35 U.S.C. 154(b) by 0 days.

(21) Appl. No.: 11/366,553

(22) Filed: Mar. 3, 2006

(65) Prior Publication Data

US 2006/0185785 A1    Aug. 24, 2006

Related U.S. Application Data

(60) Division of application No. 10/652,495, filed on Sep. 2, 2003, now abandoned, which is a continuation of application No. PCT/JP02/01798, filed on Feb. 27, 2002.

(30) Foreign Application Priority Data

Mar. 2, 2001   (JP) .............................. 2001-58188

(51) Int. Cl.
*B32B 37/12* (2006.01)
(52) U.S. Cl. .................. 156/308.2; 156/264; 156/270; 156/334; 156/184; 156/192; 29/603.06; 29/603.07
(58) Field of Classification Search .............. 156/264, 156/270, 308.2, 334, 583.1, 192, 184; 257/783; 438/118; 29/603.06, 603.07; 83/23; 361/683, 361/684; 428/480
See application file for complete search history.

(56) References Cited

U.S. PATENT DOCUMENTS

| | | | | |
|---|---|---|---|---|
| 2,528,531 | A * | 11/1950 | Marshall | ..................... 156/245 |
| 6,558,791 | B2 | 5/2003 | Matsuura et al. | |
| 2001/0015484 | A1 | 8/2001 | Matsuura et al. | |
| 2004/0071989 | A1 | 4/2004 | Kumakura | |

FOREIGN PATENT DOCUMENTS

| | | |
|---|---|---|
| EP | 0 644 560 A1 | 3/1995 |
| JP | 62-231741 | 12/1987 |
| JP | U 63-171991 | 11/1988 |
| JP | A 3-114828 | 5/1991 |
| JP | 04-072370 | 3/1992 |
| JP | 07-268286 | 10/1995 |
| JP | 08-170688 | 7/1996 |
| JP | A 10-166489 | 6/1998 |
| JP | A 10-309769 | 11/1998 |
| JP | A 11-216790 | 8/1999 |
| JP | 2000-081084 | 3/2000 |

* cited by examiner

*Primary Examiner*—Linda Gray
(74) *Attorney, Agent, or Firm*—Oliff & Berridge PLC

(57) ABSTRACT

An insulating sheet is manufactured by attaching a buffer layer and a resin film using an adhesive layer that is not adhesive at a normal ambient temperature. Since there is no need to use a release liner when manufacturing the insulating sheet, there is no release of a silicone component. Accordingly, when installing a hard disk printed wiring board, the printed wiring board and electronic circuits inside the hard disk will not be damaged by the released silicone.

7 Claims, 2 Drawing Sheets

METHOD OF MANUFACTURING HARD DISC DEVICE WITH A PRINTED WIRING BOARD FIXED THERETO

CROSS REFERENCE TO RELATED APPLICATION

This is a divisional application of U.S. application Ser. No. 10/652,495 filed on Sep. 2, 2003, now abandoned, which is a Continuation of International Application No. PCT/JP02/01798 filed Feb. 27, 2002. The entire disclosures of the prior applications are hereby incorporated by reference herein in their entirety.

BACKGROUND

The present invention relates to insulating sheets, and particularly to an insulating sheet suitable for a hard disk device.

A hard disk device (HDD) has disks with a recording layer formed on a surface, and comprises a head for writing to these disks, an arm for supporting the head, and an actuator for causing movement of the arm.

These disks are housed inside a case, and a printed wiring board for carrying out control of the actuator and input and output of data to and from the disks is located outside the case. FIG. 5 is a schematic cross sectional view of a HDD, with reference numeral 110 representing the actual HDD, reference numeral 111 representing the case of the HDD 110, and reference numeral 112 representing the printed wiring board. Electronic components are mounted on the printed wiring board 112 and an electronic circuit made up of these electronic components is connected to the bottom 117 of the actuator using a flexible wiring board 114.

An insulating sheet 113 is located between the printed wiring board 112 and the case 111, and the printed wiring board 112 is screwed to the case 111 in this state. The electronic circuit formed on the printed wiring board 112 is insulated from the case 111 by this insulating sheet 113.

The insulating sheet 113 has a buffer layer 121, an adhesive layer 122 and a resin film 123. The buffer layer 121 and the resin film 123 are glued together using the adhesive layer 122.

The adhesive layer 122 conventionally uses adhesive, and in order to maintain its characteristics, this film is supplied interposed between release liners 131 and 132, as shown in FIG. 6.

When this type of adhesive layer 122 is used, the release liner 131 is first torn off to expose one surface of the adhesive layer 122, and this exposed surface is pressed against the resin film 123. The adhesive layer 122 is a pressure sensitive resin and it will attach to the resin film 123 when the adhesive layer is pressed. Next, the other release liner 132 is torn off to expose the opposite surface of the adhesive layer 122. The adhesive layer 122 is pressed against the buffer layer 121. The resin film 123 and the buffer layer 121 will attach together by the adhesive layer 122, thus resulting in an insulating sheet 113.

Once the insulating sheet 113 is interposed between the printed wiring board 112 and the case 111, screw fastened, and the flexible wiring board 114 attached, the HDD 110 shown in FIG. 5 is completed.

As described above, with the HDD 110 of the related art, since the adhesive layer 122 is pressure sensitive and has adhesive properties at a normal temperature, the release liners 131 and 132 are indispensable when the adhesive layer 122 is rolled up for transportation or storage.

Since the release liners 131 and 132 are required to have a non-adhesive property, a material having silicone oil coated on the resin films as the base material of the release liners 131 and 132 is used. Therefore, a silicone component is attached to the adhesive layer 122, and if the silicone component is released from the insulating sheet 113 by generation of heat during driving of the HDD 110, this is likely to have a detrimental effect of the electronic circuit of the printed wiring board 112 and the electronic components inside the case 111.

Non-silicone type release liners are expensive and have poor applicability. Even if a non-silicone type release liner is adopted, it is necessary to dispose of the release liner, and this is not desirable from the point of view of reducing waste.

The present invention has been created in order to solve the above described drawbacks in the related art, and the object of the present invention is to provide an insulating sheet that does not release a silicone component.

SUMMARY

A first aspect of the present invention is an insulating sheet comprising a buffer layer having buffering attributes, an adhesive layer that is not adhesive at normal ambient (room) temperature but exhibits adhesiveness when heated, and an insulating resin film, wherein the buffer layer and the resin film layer are attached together using the adhesive layer.

A second aspect of the present invention is an insulating sheet, wherein an adhesive layer of the insulating sheet is formed of resin containing no silicone component.

A third aspect of the present invention is an insulating sheet wherein a resin film of the insulating sheet is formed from polyethylene terephthalate.

A fourth aspect of the present invention is an insulating sheet, wherein a buffer layer of the insulating sheet is formed of urethane foam.

A fifth aspect of the present invention is a hard disk device comprising a case for housing a hard disk; a printed wiring board provided with a circuit for controlling the hard disk; and an insulating sheet interposed between the printed wiring board and the case, the insulating sheet comprising a buffer layer having buffering attributes, an adhesive layer that is not adhesive at normal ambient temperature but exhibits adhesiveness when heated, and an insulating resin film, wherein the buffer layer and the resin film layer are attached together using the adhesive layer.

A sixth aspect of the present invention is a hard disk device having an adhesive layer formed of resin that does not contain a silicone component.

A seventh aspect of the present invention is a hard disk device having a resin film formed from polyethylene terephthalate.

An eighth aspect of the present invention is a hard disk device having a buffer layer formed from urethane foam.

A ninth aspect of the present invention is a method of manufacturing an insulating sheet including the steps of: bringing an adhesive layer of a sheet comprising insulating resin film and an adhesive layer attached on the insulating resin film, wherein the adhesive layer has a property of exhibiting adhesiveness when heated, into contact with a buffer layer having buffering attributes; heating the adhesive layer while pressing against the buffer layer; and attaching the resin film to the buffer layer.

The insulating sheet of the present invention has the structure as described above, where the adhesive layer of the insulating sheet is not adhesive at normal ambient temperature. Accordingly, it is possible to wind the insulating sheet up in roll form even if the release liner is not used. As a result, there is no attachment of a silicone component released from the release liner to the adhesive layer.

Figure 1:
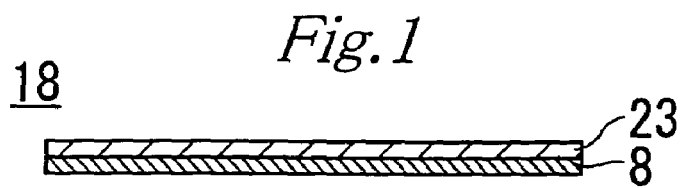
FIG. 1 illustrates a film having a two-layer structure according to an embodiment of the present invention.

In each drawing, reference numeral 8 represents an adhesive layer. Reference numeral 10 represents a hard disk. Reference numeral 13 represents an insulating sheet. Reference numeral 21 represents a buffer layer. Reference numeral 23 represents a resin film.

DETAILED DESCRIPTION OF EMBODIMENTS

Reference numeral 8 in FIG. 1 is an adhesive layer used with an insulating sheet of the present invention, and is attached in advance to a resin film 23.

This adhesive layer 8 is formed of a resin that is not adhesive at normal ambient temperature, but exhibits adhesiveness when heated, and even if an exposed surface of the adhesive layer 8 comes into contact with the resin film 23, there will not be adherence at normal ambient temperature.

Figure 2:
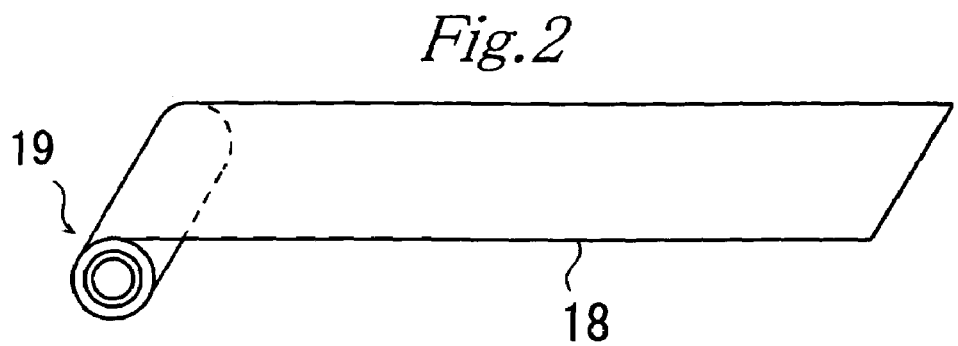
FIG. 2 illustrates a roll obtained by rolling up a two-layer structure film.

For this reason, the two-layer structure film 18 can be directly rolled up without the use of a release liner so as to be stored or transported in the form of a roll 19, as shown in FIG. 2.

Figure 3:
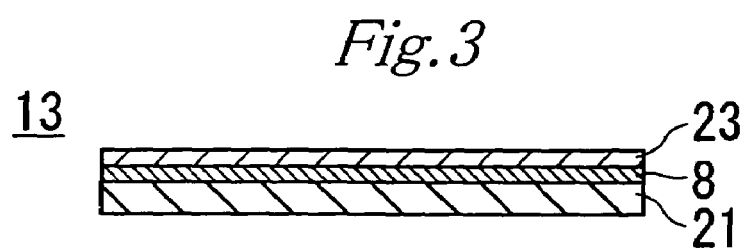
FIG. 3 illustrates an insulating sheet in an embodiment of the present invention.

The two-layer structure film 18 is unwound from this roll 19, such that the surface of the adhesive layer 8 is brought into contact with the buffer layer 21 and pressed while heating. The heating temperature is such that the adhesive layer 8 exhibits adhesiveness without deterioration of the buffer layer 21. As shown in FIG. 3, if the resin film 23 is attached to the buffer layer 21, the insulating sheet 13 of the present invention is obtained.

Figure 4:
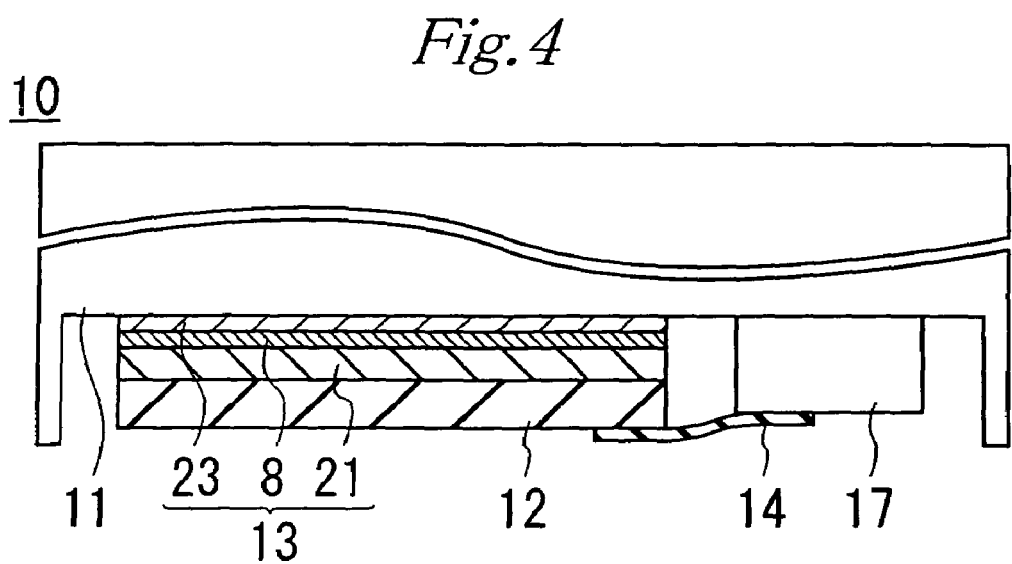
FIG. 4 illustrates one example of a HDD using the insulating sheet of the present invention.
Figure 5:
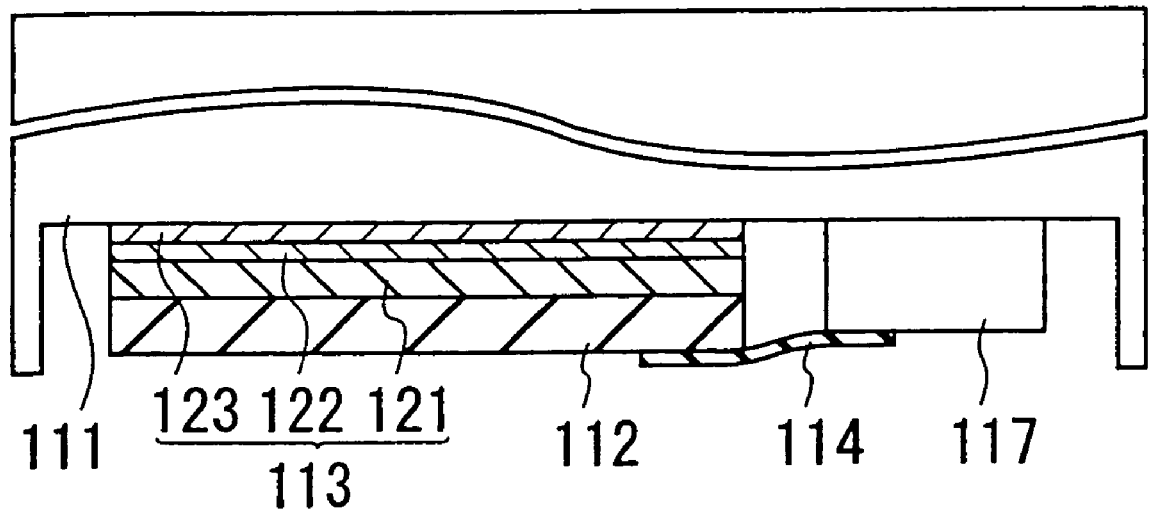
FIG. 5 illustrates a HDD of the prior art.
Figure 6:
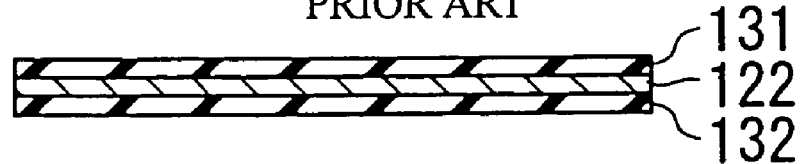
FIG. 6 illustrates an insulating sheet of the prior art.

Reference numeral 10 in FIG. 4 is a HDD using the insulating sheet 13 of the present invention. A buffer layer 21 side of the insulating sheet 13 is brought into contact with the printed wiring board 12. A resin film 23 side of the insulating sheet 13 is brought into contact with the case 11, and the printed wiring board 12 is screw fastened to the case 11. The printed wiring board 12 and an electrical circuit inside the case 11 are electrically connected to a lower part 17 of an actuator using a flexible wiring board 14.

Further, the buffer layer 21 is formed of a hard foam such as polyurethane and is elastic. After vibration and heat occurring in a motor inside the case 11 have been absorbed by the buffer layer 21, the buffer layer 21 is applied to the printed wiring board 12.

Embodiments

Insulating sheets of the first to third embodiments of the present invention are shown in Table 1 below. PET is an abbreviation for polyethylene terephthalate.

TABLE 1

Material properties and evaluation results of insulating sheets of first to third embodiments of the present invention

|  | Embodiment 1 | Embodiment 2 | Embodiment 3 |
| --- | --- | --- | --- |
| material property of resin film | PET | PET | PET |
| material property of adhesive layer | saturated polyester resin type adhesive | flame resistant polyester resin type adhesive | halogen free flame resistant polyester resin type adhesive |
| Tg of adhesive layer | 45° C. | 45° C. | 30° C. |
| flame resistance of adhesive film | non flame resistant | VTM-0 | VTM-0 Equivalent |
| buffer layer property/ flame resistance grade UL94" | flame resistant urethane foam/ HF-1 | non-flame resistant urethane foam | non-flame resistant urethane foam |
| range of urethane amount and cost of buffer layer | Δ | ◯ | ◯ |
| edge tack after die-cutting | ◯ | ◯ | ◯ |
| silicone amount | ◯ | ◯ | ◯ |
| cost | ◯ | ◯ | ◯ |
| overall evaluation | ◯ | ◯ | ◯ |

Tg of the adhesive layer in Table 1 is a glass transition point. A method of measuring Tg is to use a viscoelasticity measuring device to measure a maximum point of tan δ of 35 Hz, to give Tg. When the adhesive layer 8 of the first to third embodiments are attached to the buffer layer 21, the adhesive layer 8 is heated to 80° C.

The item 'edge tack after die-cutting' in the table is a determination as to whether or not adjacent insulating sheets 13 attach together after die-cutting. A sample for this item uses an insulating sheet 13, after being made by attaching to each other the buffer layer 21 and the resin film 23 using the adhesive layer 8. The insulating sheet 13 is die-cut in the shape of the case 11 of the HDD 10 and the printed wiring board 12. In this state, the adhesive layer 8 is exposed at the edge of the insulating sheet 13, and if the edge of the insulating sheet 13 is adhesive, adjacent insulating sheets will attach together when brought into contact with each other and operability is therefore reduced. The symbol ○ in Table 1 represents the fact that there is absolutely no attachment.

The item 'silicone amount' in the table represents a calculated result for amount of silicone content, in a state of the two-layer structure film 18 before attaching to the buffer layer 21, washing exposed surface of the adhesive layer 8 using N-hexane, enriching the obtained N-hexane and then evaluating the enriched N-hexane by FTIR (Fourier transform infrared spectroscopy). The symbol ○ represents the fact that silicone was not detected.

For the sake of comparison, characteristics of insulating sheets of the prior art are shown in Table 2 below as comparative examples 1-3.

amount, a large amount of silicone contained in the N-hexane is represented by the symbol X, and less than X is represented by the symbol Δ.

As will be understood from Table 1 and Table 2, in comparative examples 1-3, a silicone component of a release liner attaches to an adhesive layer, whereas in the insulating sheets 13 of the first to third embodiments of the present invention, silicone is not attached to the adhesive layer 8.

Also, in comparative examples 1-3, adjacent edges become attached together, whereas in the insulating sheets 13 of the first to third embodiments of the present invention, there is no attachment of adjacent edges and operability is high.

With the insulating sheet 13 of the present invention, there is a possibility of flame resistant additives being contained in the adhesive layer 8, and it is possible to broaden the material properties and compositional selection for the buffer layer 21.

It is possible to manufacture an insulating sheet without using a release liner.

What is claimed is:

1. A method of manufacturing a hard disc device with a printed wiring board fixed to, comprising the steps of:
    attaching an adhesive layer in advance to an insulating resin film to form an adhesive film, wherein the adhesive layer has adhesiveness exhibiting temperature higher than normal ambient temperature;
    winding the adhesive film up to form a roll of the adhesive film so that an exposed surface of the adhesive layer is in contact with the resin film;
    unwinding the adhesive film from the roll;

TABLE 2

Material property and evaluation results for insulating sheets of comparative examples 1 to 3 of the prior art

|  | comparative examle 1 | comparative examle 2 | comparative examle 3 |
|---|---|---|---|
| material property of resin film | PET | PET | PET |
| material property of adhesive layer | acrylic adhesive | acrylic adhesive | flame resistant acrylic adhesive |
| Tg of adhesive layer | −10° C. | −10° C. | −20° C. |
| flame resistance of adhesive film | non flame resistant | non flame resistant | VTM-0 |
| material property of release liner | low silicone type | non-silicone type | low silicone type |
| peeling force of release liner | ○ | Δ~X | ○ |
| buffer layer property/ flame resistance grade UL94″ | flame resistant urethane foam/ HF-1 | flame resistant urethane foam/ HF-1 | low-flame resistant urethane foam/ HF-2 |
| range of urethane amount and cost of buffer layer | Δ | Δ | ○ |
| edge tack after die-cutting | Δ | Δ | Δ |
| silicone amount | Δ~X | ○ | Δ~X |
| cost | Δ | Δ~X | Δ |
| overall evaluation | Δ~X | Δ~X | Δ~X |

The item 'release force of release liner' in Table 2 represents less than 0.5N/5 cm as ○, from 0.5 to 1N/5 cm as Δ, and in excess of 1N/5 cm as X. The symbol ○ for edge tack after die-cutting represents the fact that there was slight attachment of adjacent insulating sheet edges, but they detach under their own weight. In the evaluation for silicone bringing the exposed surface of the adhesive layer into contact with a buffer layer having elastic attributes and heating the adhesive layer while pressing against the buffer layer; thereby attaching the resin film to the buffer layer with the adhesive layer to form an insulating sheet; and fastening the printed wiring board to a case of the hard disc device in a state that the insulating sheet is located between the printed wiring board and the case of the hard disc device.

2. The method of manufacturing a hard disc device with a printed wiring board fixed to according to claim 1, further comprising the step of die-cutting the insulating sheet, wherein the insulating sheet located between the printed wiring board and the case is the insulating sheet die-cutted.

3. The method of manufacturing a hard disc device with a printed wiring board fixed to according to claim 2, wherein the buffer layer side of the insulating sheet located between the printed wiring board and the case is brought into contact with the printed wiring board and the resin film side of the insulating sheet located between the printed wiring board and the case is brought into contact with the case.

4. The method of manufacturing a hard disc device with a printed wiring board fixed to according to claim 1, wherein the adhesive layer is formed of resin that does not contain a silicone component.

5. The method of manufacturing a hard disc device with a printed wiring board fixed to according to claim 4, wherein the adhesive layer is formed from polyester resin.

6. The method of manufacturing a hard disc device with a printed wiring board fixed to according to claim 1, wherein the resin film is formed from polyethylene terephthalate.

7. The method of manufacturing a hard disc device with a printed wiring board fixed to according to claim 1, wherein the buffer layer is formed of urethane foam.

* * * * *